April 20, 1926.  
R. G. COATES  
1,581,513  
METHOD AND APPARATUS FOR CUTTING OFF INGOT MOLDS AND THE LIKE  
Filed August 17, 1922 6 Sheets-Sheet 2
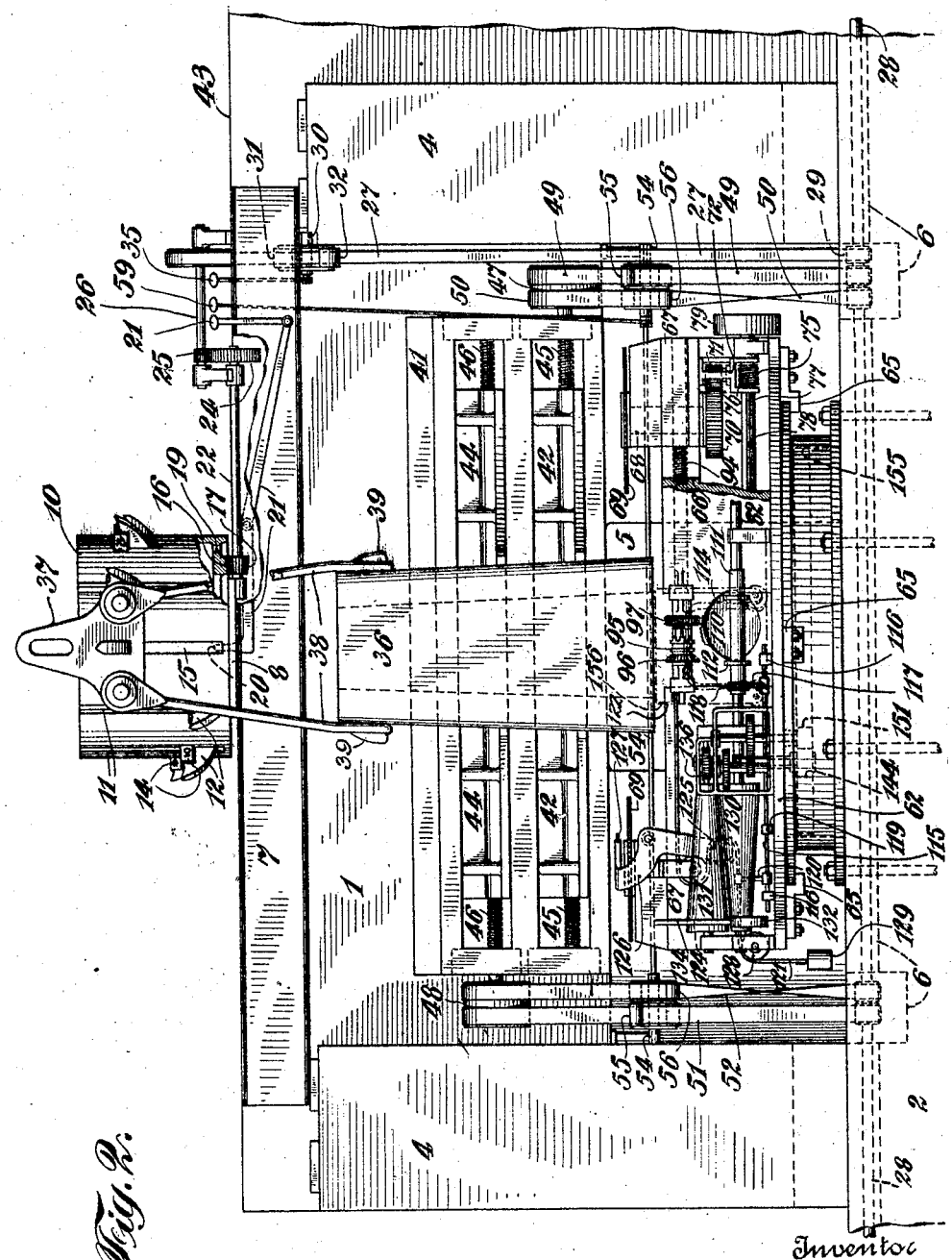
Inventor  
Ray G. Coates  
By George Ramsey  
his Attorney

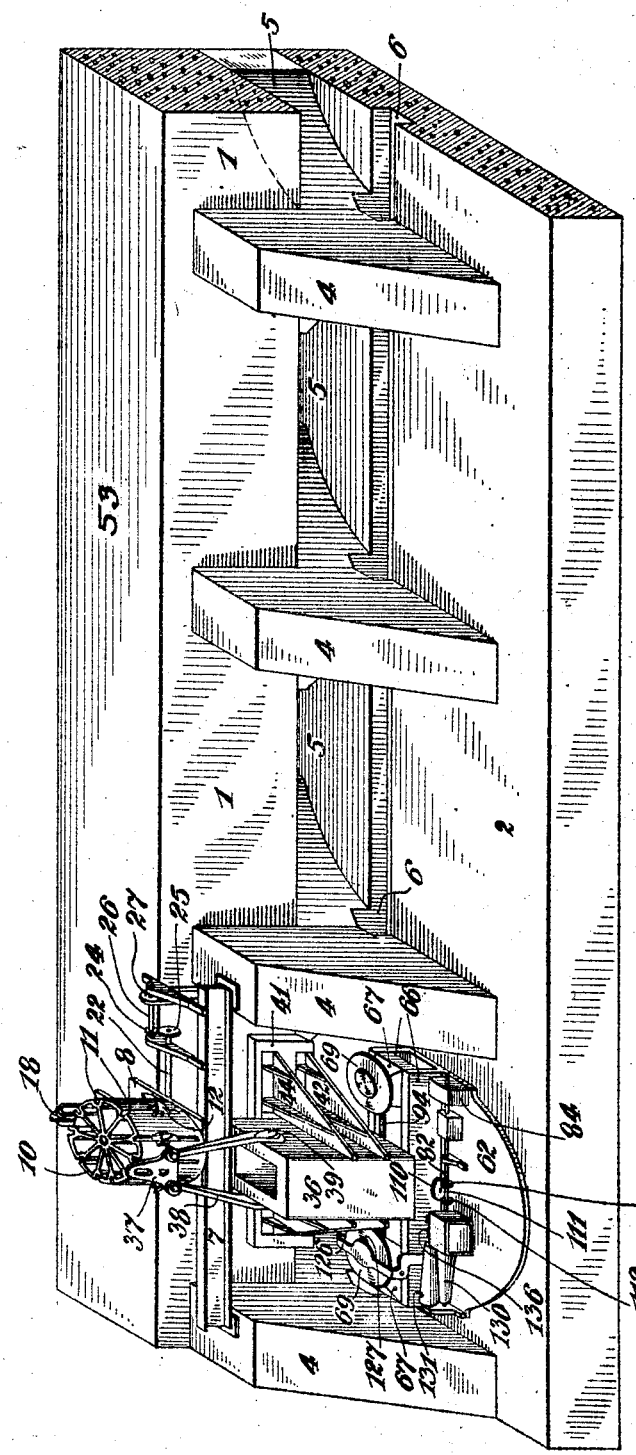

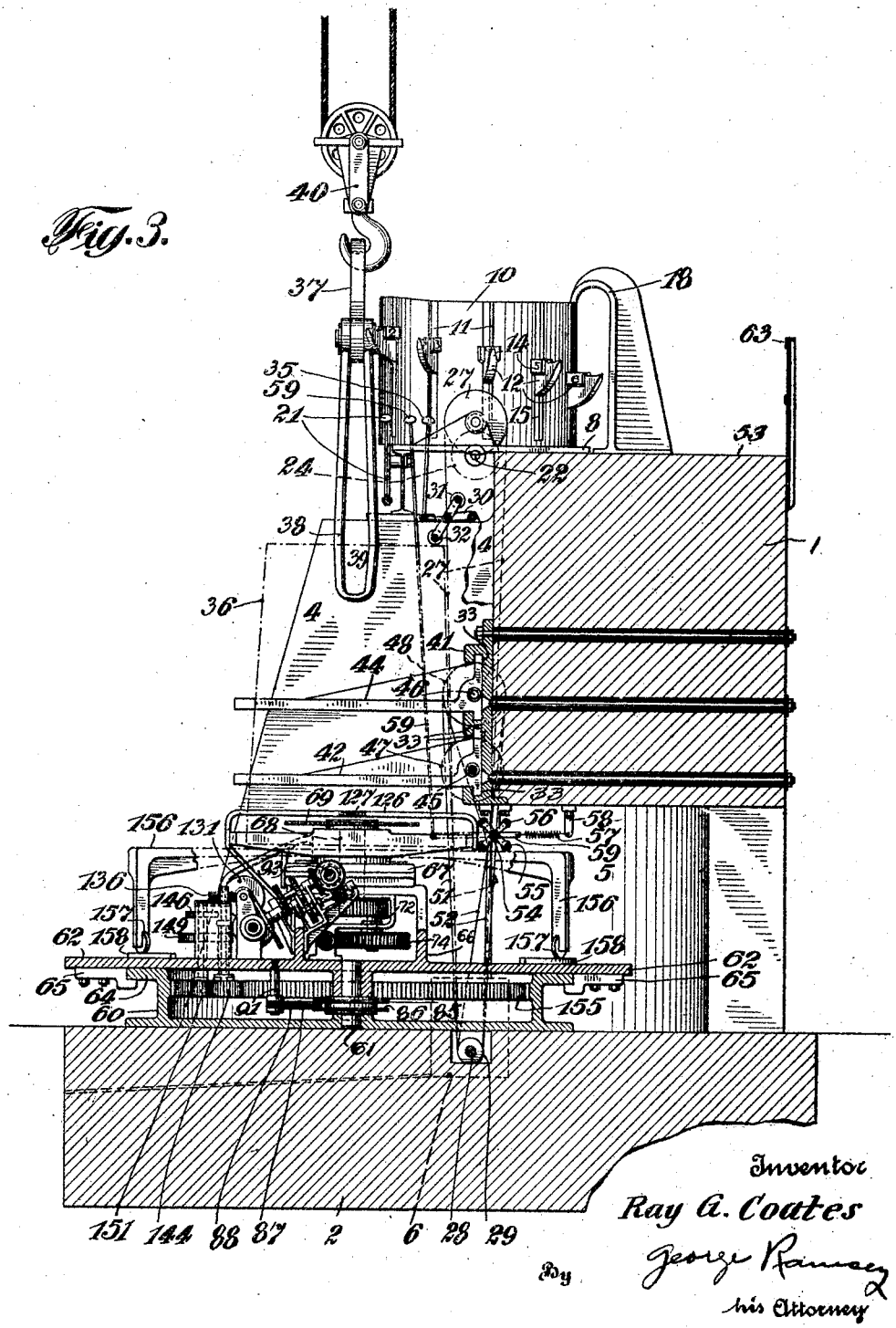

April 20, 1926.
R. G. COATES
1,581,513
METHOD AND APPARATUS FOR CUTTING OFF INGOT MOLDS AND THE LIKE
Filed August 17, 1922    6 Sheets-Sheet 4
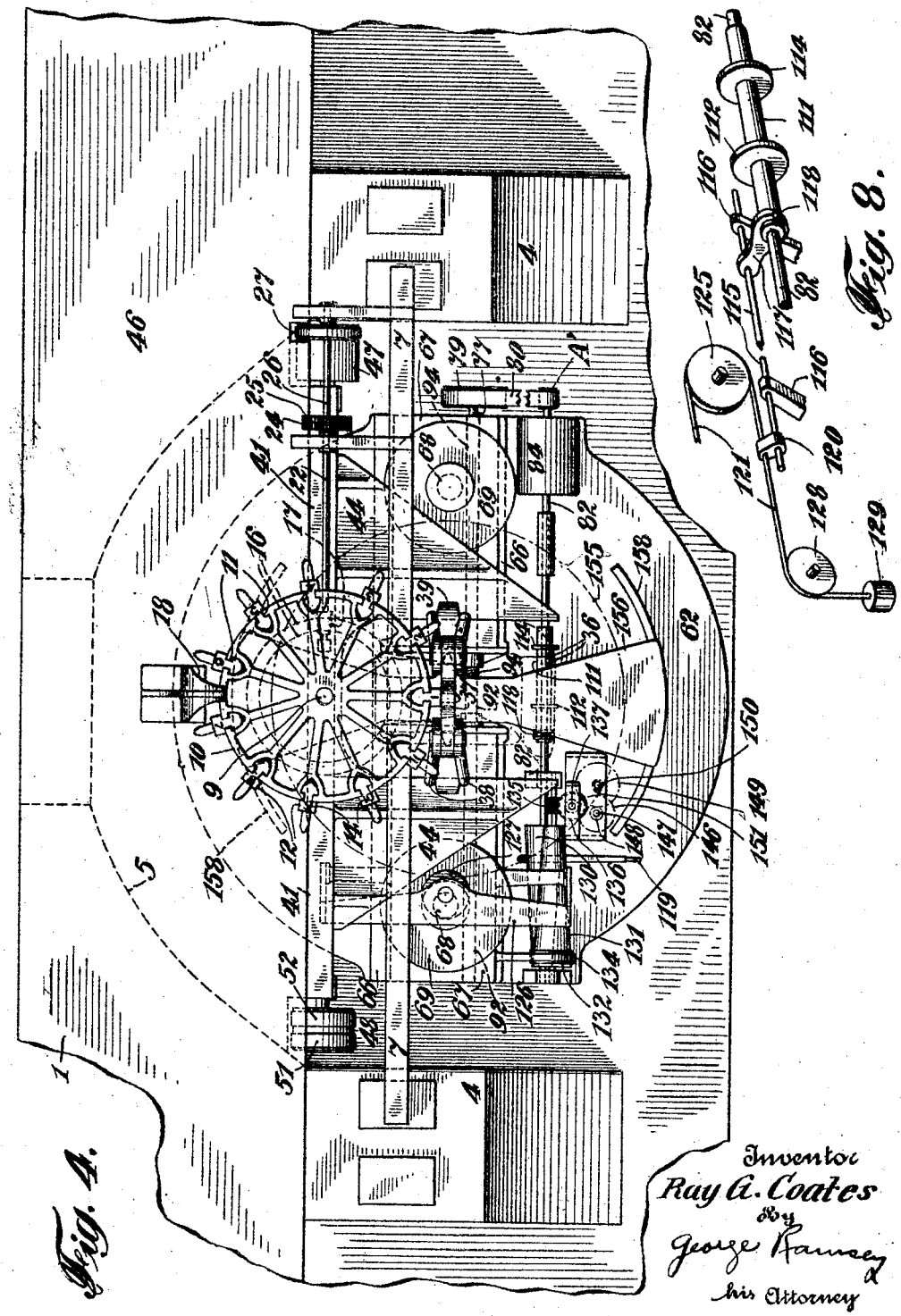
Inventor
Ray G. Coates
By
George Ramsey
his Attorney

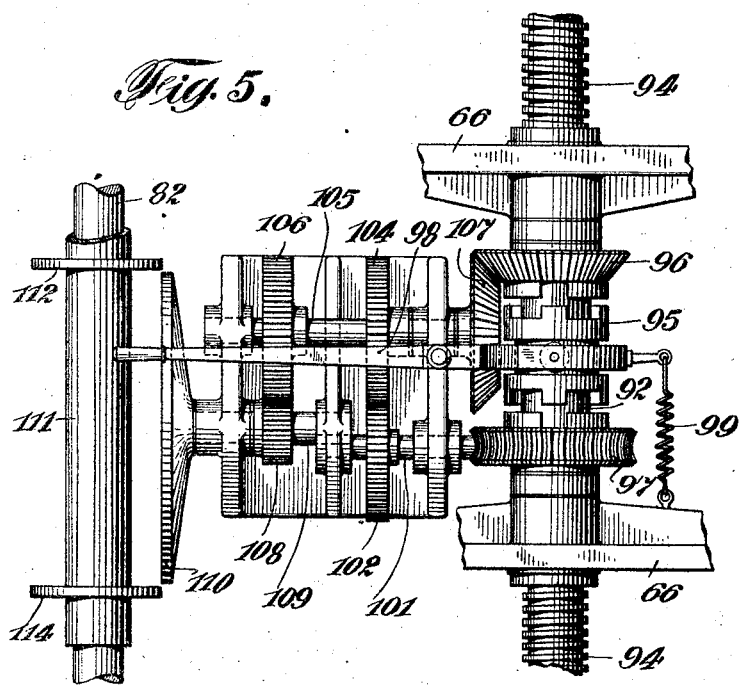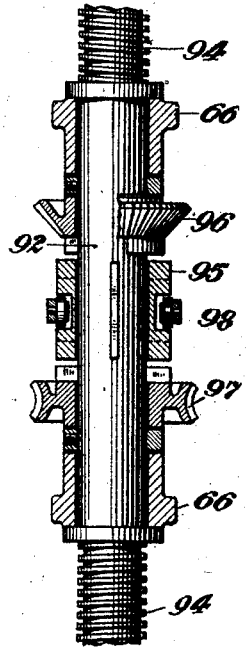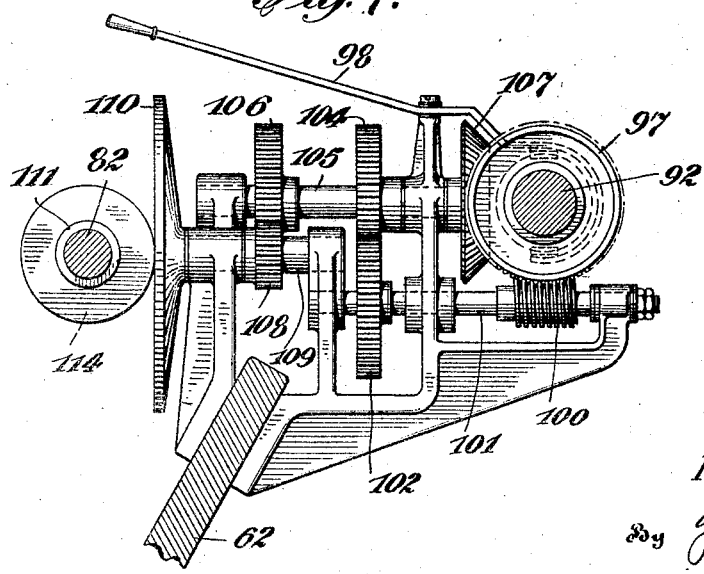

April 20, 1926.
R. G. COATES
1,581,513
METHOD AND APPARATUS FOR CUTTING OFF INGOT MOLDS AND THE LIKE
Filed August 17, 1922    6 Sheets-Sheet 6
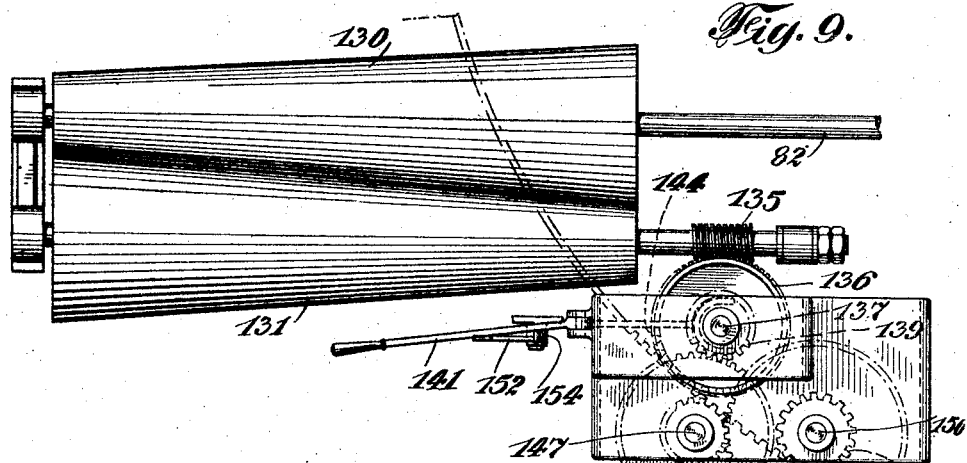
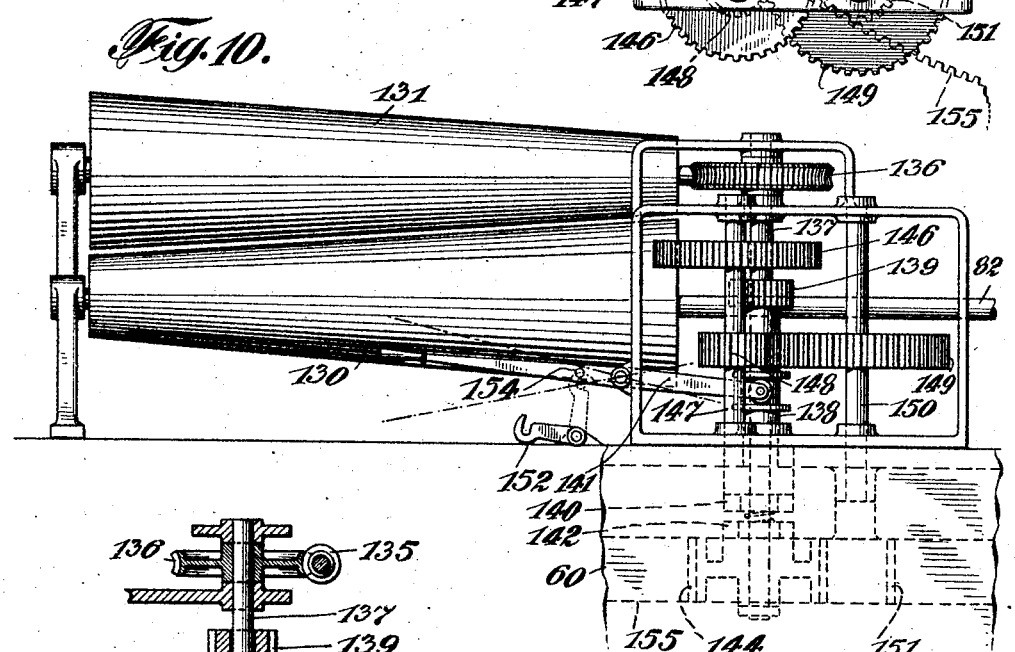
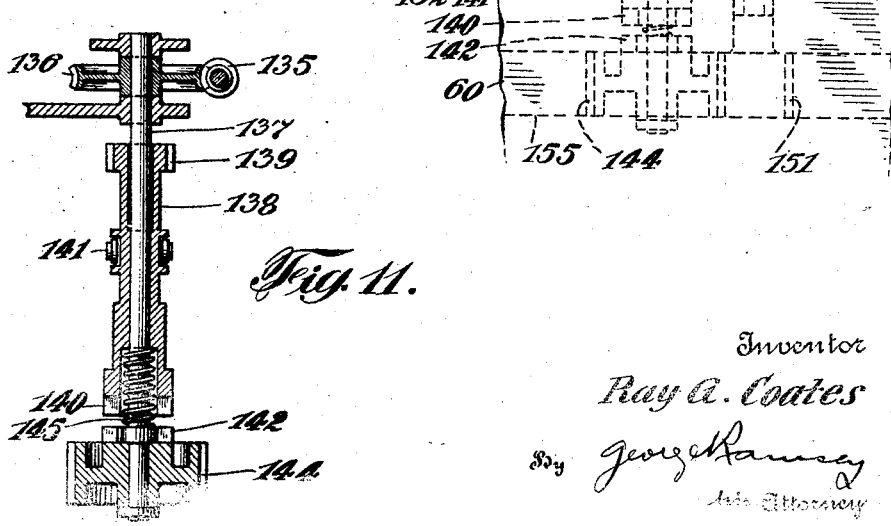
Inventor
Ray G. Coates
By George Ramsey
His Attorney Patented Apr. 20, 1926.

1,581,513

UNITED STATES PATENT OFFICE.

RAY G. COATES, OF PASADENA, CALIFORNIA, ASSIGNOR, BY MESNE ASSIGNMENTS, OF ONE-HALF TO THE ESTATE OF H. G. HAMILTON, DECEASED, LATE OF YOUNGSTOWN, OHIO.

METHOD AND APPARATUS FOR CUTTING OFF INGOT MOLDS AND THE LIKE.

Application filed August 17, 1922. Serial No. 582,345.

*To all whom it may concern:*

Be it known that I, RAY G. COATES, a citizen of the United States, residing at Pasadena, in the county of Los Angeles, State of California, have invented certain new and useful Improvements in Methods and Apparatus for Cutting Off Ingot Molds and the like, of which the following is a specification.

This invention relates broadly to mechanism for cutting large metal objects and more broadly to a method and apparatus for cutting off the ends of ingot molds.

The principal object of the present invention is the provision of a mechanism for suspending large metal objects such as ingot molds and cutting portions from the said object while so suspended.

A further object of the present invention is a device for sawing objects in such manner that the relative movement between the saw and the object is controlled by the shape of the object.

A still further and important object of the present invention is a machine for cutting large metal objects wherein said objects are cut by means of an annular progressive movement between the cutting device and the object, and wherein the speed of cutting is controlled by the shape of the object.

A further and important object of the present invention is the provision of a machine for cutting portions from ingot molds and the like wherein suspension means are provided in such manner as to comprise a plurality of suspension members arranged at different heights so that the object to be cut may be suspended in such manner as to bring the proper portion of the object adjacent the cutting zone.

Another important object of the present invention is the provision of a machine for cutting ingot molds and the like and wherein a plurality of simultaneously operated cutting devices are adapted for successively attacking the object to be cut, whereby the speed of cutting is facilitated.

Another and important object of the present invention is a machine for cutting off ingot molds provided with power operated mold clamps constructed to be automatically centered beneath suspension mechanism for sustaining the weight of the ingot mold during the cutting operation.

Another and important object of the present invention is a mechanism for cutting off ingot molds, which mechanism comprises a suspension for sustaining the weight of the mold, clamp jaws for holding the mold during the cutting operation, and a rotating table provided with a plurality of cutting saws adapted to simultaneously attack the mold at a plurality of points, and with the provision of a suitable table for supporting the cut off scrap.

Another and primary object of the present invention is the method of cutting ingot molds by suspending the molds during the cutting operation and by cutting the scrap from the bottom of the mold in such manner that the scrap tends to fall vertically away from the suspended mold.

Another and important object of the present invention is the method of cutting end portions of ingot molds or the like, which comprises suspending the mold during the cutting operation and attacking the mold simultaneously from a plurality of different points whereby the scrap tends to fall vertically from the mold instead of swinging downwardly against one side of the mold.

A still further object of the present invention is the method of cutting irregularly shaped articles by guiding the cutting device by the shape of the article to be cut.

Other and further objects of the present invention will in part be obvious and will in part be pointed out hereinafter in the specification following by reference to the accompanying drawings in which like characters are used to represent like parts throughout the several figures thereof.

Figure 1 is a perspective view illustrating the foundation for a battery of cutting-off machines and showing one machine installed;

Figure 2 is a front elevation of one cutting-off machine;

Figure 3 is an end view of the device.

Figure 4 is a plan view of one unit of the device as illustrated in Figure 2;

Figure 5 is a detail plan view of the driving mechanism for radial feed of the saws;

Figure 6 is a detail view of the clutch for the drive shown in Figure 5;

Figure 7 is a detail end view of the drive shown in Figure 5;

Figure 8 is a detail view of a portion of the automatic control for the saw feed;

Figure 9 is a diagrammatic plan view of the turn table feed;

Figure 10 is a front elevation view of the same;

Figure 11 is a detail view of the turn table clutch.

Realizing that the present invention may be carried out by methods other than those described herein, and may be embodied in constructions other than those specifically shown and described, I desire that the disclosure herewith shall be considered as illustrative and not in the limiting sense.

In casting ingot molds in the inverted position from direct metal, it is usually necessary to cut off the upper part of the casting in order to provide the finished mold with a base of solid metal and to finish the end of the mold. Furthermore, in view of the fact that ingot molds are usually cast in open molds, there is usually an annular pipe in that part of the casting which is uppermost when the metal is poured. When the annular pipe is short and the spongy metal is of a relatively small amount, work may be done by merely trimming the mold on a planer. Where this is done all of the metal cut off is in the form of chips. If the part to be cut off is relatively large, then it is desirable to cut through the solid metal. This may be done in many ways, but preferably with a saw of such size that the kerf is no thicker than is necessary to separate the parts. Where the second scheme is used, the scrap comprises a solid piece of metal as well as chips, and the thicker the part cut off the greater the ratio of solid part to chips in proportion to the amount of metal removed. Also less time and power is required than would be necessary to perform the work by a planing operation. Furthermore, the solid piece cut off is saleable metal.

Heretofore in the art the cutting of heavy metal pieces of this character has been done by reciprocating saws of the hack saw type and this produces several difficult problems such as pinching of the saw due to cutting across the opening of the mold, the slow operation of the reciprocating saw, difficulties in positioning and holding work to be operated on by reciprocating saws, and other troublesome features. Machines adapted to cut off these large sections must be so arranged as to reduce the time of setting of the moving molds and the actual cutting off operation to a minimum in order to eliminate as much as possible the element of labor cost. In view of the fact that molds are of various lengths, the machine must require considerable adjustment to meet these variations, and since cross-sections of molds also vary for different types of molds it must be adjustable likewise to meet this element. Machines of this type must be constructed so as to be capable of operation by ordinary labor so that the amount of handling required from the attendant will be as simple and as little as is possible.

The method and apparatus hereinafter to be explained in detail overcomes the difficulties of the known art and meets the requirements of the art by providing a standard hanger which may be operated by a crane to lift the mold by the mold lugs. The machine is provided with a multiple bracketed hook support upon which a crane may place the hanger, with the mold attached. Definite bracket hooks are provided to automatically bring the mold to such position that the point for the saw kerf is at the desired elevation for operations, thereby doing away with the necessity of spending any time which otherwise would be necessary for measurement or for adjusting or positioning. The mold, when so positioned, is between suitable clamping jaws which may be power operated to automatically clamp and center the mold for such operations with the weight of the mold being carried through the standard hanger by the bracketed hook specified. Preferably the actual sawing mechanism is carried by a turn table under and concentric with the axis of the suspended mold. The sawing mechanism is arranged in such manner that saws may be brought against the side of the mold at which time a rotational movement of the turn table begins around the vertical axis of the mold so that continued operation makes a clear cut entirely around the mold wall and the saws cut inwardly and around the mold until the mold wall is severed. In order to shorten the time of cutting the mold wall preferably is attacked in several places simultaneously by saws so arranged that a partial rotation of the turn table will cause the saw kerfs to run one into another, thereby forming one continuous kerf. This method and construction is further advantageous in that it permits of the use of relatively thin saws of small diameter, thereby resulting in a narrow kerf with a saving in the first cost of saws and in the power consumed in their operation. Since the scrap cut off is on the under side of the saw, it falls away from the saw rather than against the saw when it finally separates from the mold. In view of the fact that several cuts are simultaneously made, the scrap is attached to the mold at a number of separate points during the cutting off operation so that when it finally falls it tends to fall vertically rather than to swing against one side or the other, as would be the case if a single saw were used in the cutting off operation.

In view of the fact that ingot molds are rectangular and in view of the fact that the turn table saw turns on the axis of the mold, it is evident that the various cutting distances from the axis of the mold will cause a variation in the cutting speed if the revolution of the turn table is constant. Furthermore, if a safe rate of speed be determined for the maximum diameter then the saw will be cutting at a very slow rate of speed when near the axis and this would result in a loss of capacity of the machine. In order to maintain a proper maximum cutting speed, the turn table is driven at a variable angular speed in such manner that as the saws approach the axis of the mold the angular motion of the turn table increases and, conversely, as the saws recede from the axis of the mold the angular speed automatically decreases. The uniform feed of the small saws may be accomplished by providing a "feeler roller" which runs in contact with the outer surface of the mold and controls the mechanism which regulates the distance of the saw center from the axis of the mold and at the same time regulates the angular feed of the saw turn table. By using small saws, the same amount of stiffness will be obtained in a thin saw that would be found in a larger saw having a much thicker kerf. Small saws, therefore use less power since the chip is narrower for the same depth of feed. A scrap table is provided to support the scrap that falls from the mold and facilitates the removal of the scrap from the cutting off machine.

Referring now to the drawings, and more specially to Figure 1, which illustrates a plurality of compartments or stalls adapted to receive cutting off units and wherein only one unit is illustrated as being installed. Preferably the foundation for the cut off units comprises a back wall 1, a horizontal foundation 2 and division walls 4 which separate the units and provide supports for portions of the mechanism. The back wall 1 is under-cut as at 5 to provide proper space for the turn table hereinafter to be described. The foundation is provided with a channel or trench 6 for a power line shaft adapted to furnish power for certain of the operations and also this channel provides a conduit for suitable electrical wires adapted for driving certain parts of the machine.

The machine may be divided broadly in three general groups of mechanism. The first group comprises the devices for suspending the ingot molds in proper position for the cut off operation and includes the construction whereby adjustments are facilitated to secure the mold at the vertical height desired.

The second groups of devices comprises the automatic chucking or clamping mechanism whereby the ingot mold is securely held in the adjusted position determined by the suspending devices and wherein the mold is automatically centered over the cutting off turn table.

The third group of mechanism comprises the cutting off devices which may be divided into sub-groups of control mechanism, driving mechanism and arrangements for disposal of the cut-away scrap.

The first group of devices preferably comprises a simple mechanism for suspending the molds over the cut off table. This mechanism may take various forms but preferably the construction is in accordance with the drawings herewith, wherein a supporting beam 7 is mounted upon adjacent division walls 4 and carries the forward end of a base plate 8 which is anchored to the back wall 1. This base plate carries a vertical post 9 around which the rotary head 10 is adapted to revolve. Preferably this rotary head comprises a spoked drum having a plurality of under-cut vertical slots 11 on its periphery. Suspension hooks 12 are adapted to slide into and be interlocked with the under-cut slots and preferably each suspension hook is provided with a designating character or numeral 14. These suspension hooks are positioned at different vertical heights in the vertical slots 11 by means of feeler plugs 15 which are dropped into the slots 11 prior to placing the suspension hooks in position. The under part of the rotary head is provided with an annular gear 16. This annular gear meshes with pinion 17 on the driving mechanism, which may be utilized for rotating the head when desired. A safety guard 18 is anchored to the back wall 1 and extends over the upper edge of the rotary head on the side opposite to the portion adapted to sustain the weight of the ingot so that the post 9 is relieved of any force which tends to break or bend the post. It is to be understood that the base of the rotary head sets against the base plate 8 so that weights are supported directly on the base plate. The rotary head 10 is provided with suitable stop openings 19 which are adapted to be engaged by the end 20 of the latch lever 21.

The pinion 17 is mounted on a shaft 22 which is connected by reduction gears 24 and 25 with a counter shaft 26 that is driven by the belt 27 from the main shaft 28 which runs through the trench 6 of the power line channel. This belt 27 is normally loose and hangs away from the pulley 29 on the main shaft 28 sufficiently so that there is no tendency of the belt to drive the counter shaft 26. A belt tightener 30 comprising a pair of opposed pulleys 31 and 32 which are arranged on each side of the belt 27 and normally maintained out of contact with the belt. However, when the handle 35 is lowered the pulleys 31 and 32 are brought into contact with the belt 27 thereby tending to produce loops in the belt which tightens the same against the driving pulley 28 on the main shaft. This tends to rotate the counter shafting and the head 10 to position any desired suspension hook in operative relation to overhang the supporting beam 7. The filler blocks 15 in the slots 11 position the hooks at various heights which are predetermined according to the length of the ingot 36 to be cut off. This obviates measuring and permits the same hook to be used continually where the ingot lengths are substantially uniform. The belt tightener 30 is loosened and the latch lever 21 is operated to cause the end 20 thereof to engage the proper stop opening 19 thereby locking the rotating head in position. An ingot carrier comprising a triangular frame 37 is provided with a pair of loop links 38 which are adapted to engage the ingot lugs 39 so that the ingot may be lifted by a suitable crane 40. The triangular frame 37 is then hung upon a hook 12 thereby positioning the suspended ingot in front of the main bed plate 41, and at the proper height as specified.

Referring now to the second group of mechanism which comprises the automatic chuck or clamping jaws for holding the ingot mold. When the ingot 36 has been suspended upon the hook 12 it is positioned between two pairs of clamping jaws 42 and 44, slidably mounted in the guideways 33 of bed plate 41 which is bolted to the wall 1. These clamping jaws are also mounted upon right and left hand screws with the pair of jaws 42 mounted on the lower pair of screws 45 and the upper pair are mounted on upper pair of screws 46. These pairs of screws each are formed upon a single shaft with the lower pair of screws 45 carrying a wide faced pulley 47 and upper pair of screws 46 carrying similar wide faced pulley 48. The pulley 47 carries a pair of belts 49 and 50, and the pulley 48 carries another pair of belts 51 and 52. The belts 49 and 51 are straight run belts whereas the belts 50 and 52 are cross belts. These several belts 49, 50, 51 and 52 are sufficiently slack so that normally the main drive shaft does not tend to drive the right and left hand screw shafts 45 and 46. The belt tightener shaft 54 extends across beneath the right and left hand screw shafts and is provided on each end with two pairs of belt tighteners 55 and 56. A coil spring 57 is attached to an anchor 58 and to a lever 59 which is fastened on a belt tightener shaft 54 and normally maintains both pair of belt tighteners out of contact with the belts. When the belt tightener shaft 54 is locked by means of hand lever 59, one or the other pairs of belt tighteners 55 or 56 is brought into contact with its respective belts and thereby tightens the same so that said belts become effective to drive the screws 45 and 46. When the hand lever 59 is raised upwardly the belt tighteners 55 are effective on the belts 49 and 51 thereby causing the screws to be driven to operate the clamping jaws in one direction and when the hand lever 59 is pushed downwardly the belt tighteners 56 are effective to cause the cross belts 50 and 52 to drive thereby driving screws in the opposite direction. These screws operate the pairs of clamping jaws and thereby clamp the ingot mold 36 accurately in position directly beneath the supporting hook 12. It will be noted that the operating levers 21, 35 and 59 are all extended upwardly so as to be capable of operation from the main platform 53 which is provided with a suitable hand rail 63.

The third group of mechanism, comprising cutting-off devices, may be divided into sub-groups, the first of which comprises the supporting members for the saws; the second, control mechanism for controlling the radial feed of the cutting-off saws; and the third comprising the annular feed for the saws.

Referring now to the drawings, a rigid foundation plate 60 is adapted to carry a center or king pin 61 upon which is mounted the saw table 62. It will be noted this saw table is adapted to rotate upon the flange 64 of the foundation plate 60 and that the saw table is held in position by means of jaws 65 which extend over the edge of the flange. The connection between the flange 64 and the saw table is illustrated as a friction connection but it is obvious that suitable anti-friction devices may be interposed if desired. The saw table carries bed plates 66 upon which saw blocks 67 are adapted to slide. These saw blocks 67 carry vertical shafts 68 upon which are mounted cutting saws 69. The lower ends of the shafts 68 are provided with gears 70 which mesh with pinions 71 on stub shafts 72, which stub shafts carry on their lower end worm wheels 74 that mesh with worms 75 that are carried between the arms of brackets 76, which brackets are attached to and therefore travel with the saw blocks 67. The worms 75 are slidably mounted on a drive shaft 77 and are provided with a key which engages the slot 78 in the shaft 77 so that the saw blocks may be slidable on the bed plates 66 without disturbing the driving connection for the saws. The saw drive shaft 77 is provided on one end with a pulley 79 which is connected by means of a belt 80 with the motor driven pulley A′ which is on the motor shaft 82 that receives its power from a suitable electric motor 84. This motor is energized through collector rings 85 and 86 on the base of the king pin 61 and brushes 87 and 88 are carried by the saw table 62 so as to rotate around the collector rings, which are stationary, when the saw table rotates. Suitable wires (not shown) pass through a tube 91 on which the brushes are mounted and these wires are connected with the electric motor 84 so that the electrical current may be supplied thereto when desired. The saws 69 are arranged on diametrically opposite sides of the king pin in such manner as to be capable of attacking the base of the ingot 36 from diametrically opposite points. These saws are relatively small in size and therefore the same stiffness may be obtained with a less thickness than is possible with a larger saw. This permits smaller chips to be cut and thereby conserves metal and at the same time since the width of the chip is small the power factor driving the saw is also relatively small.

The radial feed for the saws will now be described and comprises a shaft 92 which is provided on each end thereof with right and left hand screws 94. These screws are threaded through the saw blocks 67 so that when the shaft 92 is rotated the saw blocks either approach the axis of the king pin or recede therefrom, dependent upon the direction of rotation of the shaft 92. This movement slides the worm 75 on the saw drive shaft 77 as has previously been explained. The central portion of shaft 92 carries a clutch member 95 which is splined to rotate with the shaft but which is slidable thereon within predetermined limits. The shaft 92 also carries a bevel gear 96 on one side of the clutch member 95 and a worm gear 97 on the other side of the clutch member. Both the gear 96 and the worm gear 97 are loosely mounted upon shaft 92 to freely rotate thereon.

Referring now more specially to Figures 5, 6, and 7 it will be noted the clutch member 95 is provided with a hand lever 98 which normally urges the clutch member into engagement with the worm gear because of the pull of the coiled spring 99. A worm 100 engages the worm gear 97 and is mounted on a shaft 101 which carries a gear 102. The gear 102 is in engagement with a similar gear 104 mounted on a counter-shaft 105 that carries another gear 106. This shaft 105 also carries a bevel gear 107 that is in engagement with the bevel gear 96. The gear 106 meshes with the pinion 108 on the stub shaft 109 which carries at its outer end a friction plate 110. This friction plate is mounted adjacent the motor shaft 82 with its face parallel to the axis of the shaft. The motor shaft carries a quill 111 on which is mounted a pair of friction drive rolls 112, 114. These drive rolls are mounted on the quill a sufficient distance apart so that when the quill is positioned exactly central of the friction plate neither of the friction drive rolls contact with the plate. The quill 111 is splined to the motor shaft 82 in such manner as to be compelled to rotate therewith but at the same time is freely slidable thereon. When the friction drive roller 112 is in contact with friction plate 110 this plate and its connected gearing will be driven in one direction and when the fricton drive roll 114 is in contact with this plate 110 the plate and its connected mechanism will be driven in the opposite direction. The hand lever 98 is adapted to be used to swing the clutch member 95 into engagement with the beveled gear 96 when it is desired to operate the shaft 92 at high speed to position the saw blocks. However, as soon as the hand lever is released the coiled spring 99 throws the clutch into engagement with the slow speed worm drive.

A control rod 115 is mounted in brackets 116 for slidable movement and carries a bifurcated member 117 which engages a groove 118 in the end of the quill 111 so that when the control rod 115 slides in the brackets 116 it transmits a corresponding sliding movement to the quill 111, thereby controlling the position of the friction drive rolls 112 and 114 in their relation to the friction plate 110. The control rod may be hand operated when desired but preferably the control rod is automatically operated by means of a connection 120 which is secured to a control rope 121. This control rope is anchored at 122 on a part of the bed plate 66 and passes over a guide pulley 124 which is carried by the saw block 67 at the left of the machine. The control rope continues over a second pulley 125 that is mounted on the end of a lever 126 in the form of a rod which extends over the saw 69 and extends beneath the saw. This lever carries a feeler roller 127 which normally extends in front of the hub of the saw 69 due to the fact that the control rope 121 after passing around the second pulley 125 continues over a stationary pulley 128 which is mounted on the saw table 62 and the end of the rope carries a weight 129. The normal action of the weight on the rope is to draw the pulley 125 toward the guide pulley 124. The limit of this movement is controlled by suitable stops so that the parts are normally held in the position shown in Figure 2. When the parts are in the position shown in Figure 2 with friction drive roller 114 in contact with the friction plate 110, and assuming the motor to be running, the plate will be driven in such direction that the connecting gear wheels will tend to drive the worm 100 in a direction which will operate the shafts 92 to cause the right and left hand screws 94 to draw the saw blocks toward each other, that is toward the axis of the king pin 61. In view of the fact that the coil spring 99 normally causes the clutch member 95 to engage the worm gear 97 it therefore will appear that the rotative movement of the worm 100 is transmitted to the screws 94 and that the saw blocks are moved as indicated. The inward movement of the saw blocks does not change the relation of the pulleys 124 and 125 on the control rope, consequently the inward movement of the saw blocks is continued and the saw blades encounter the side walls of the ingot mold 36 and continue to travel inwardly until the saw blades have cut through the side wall of the ingot. When the inward movement continues further the feeler roller 127 contacts with the side wall of the ingot, thereby swinging the arched lever in such manner as to separate the pulleys 124 and 125 and thereby shortening the effective length of the control 121. This gives a sliding movement to the control rod 115 which movement is communicated to the quill 111 and the friction drive roller 114 is disengaged from the plate 110 at which time further inward movement of the saws is stopped.

It now becomes desirable to cause an angular rotation to the saw table and the mechanism for controlling this angular movement may be referred to as the third sub-group of the saw table mechanism. This mechanism comprises a driving cone 130 which is mounted on the motor shaft 82 and consequently rotates when the motor shaft is driven. A driven cone 131 is mounted adjacent the driving cone 130 and a suitable driving connection is provided between these cones. This connection may take the form of a belt 132 which may be placed either around the cones or between the cones, and is controlled by a belt shifter 134 carried by the left hand saw block 67 so that as the saw block moves inwardly the belt 132 is moved between the cones to increase the speed of rotation of the driven cone 131. This driven cone carries a worm 135 which meshes with a worm wheel 136. Referring more specially to Figures 9, 10 and 11 it will be noted that this worm wheel 136 is mounted on the upper end of the vertical shaft 137 which carries a tube 138 that is splined to shaft 137 to rotate therewith but is slidably mounted thereon. This tube carries a small pinion 139 on the upper end and a clutch head 140 on the lower end. A hand lever 141 is adapted to slide the tube 138 on the shaft 137 when desired. The clutch member 140 is adapted to be slid into engagement with the clutch 142 on a driven gear 144 but is normally held out of engagement therewith by the coiled spring 145. The small pinion 139 may be raised into engagement with the gear 146 on a countershaft 147 which carries the pinion 148 that meshes with the gear 149 on a second countershaft 150 which carries a driving pinion 151 that meshes with the large annular gear 155.

From the foregoing disclosure it will appear that the vertical shaft 137 is the driving member and power may be communicated from this member either directly to the driven gear 144 by using the hand lever 141 to shift the clutch member 140 into engagement with the clutch 142; or power may be communicated directly to the drive gear 151 through small pinion 139 to gear 146, countershaft 147, pinion 148, the large gear 149, on the second countershaft 150, and finally to the driving pinion 151 meshing with rack 155. When the power is transmitted directly through the clutch members gear 144 is driven at a relatively high speed to position the saw table in any desired angular position; and when power is communicated through the pinion 139 and the train of gears described the driven gear 151 is driven at a relatively slow speed such as is needed when the saws are cutting. It will be noted, that the spring 145 normally holds the tube 138 in intermediate position so that it requires manual operation to displace the tube from intermediate position into either driving position. In order to hold the tube raised with the small pinion 139 in contact with gear 146 which is the normal drive, the latch 152 may be provided, which is capable of being raised to engage a pin 154 on the hand lever 141 and thereby hold the hand lever in lower position with the tube raised. The foundation plate 60 is provided with a large annular gear 155 with which gears 144 and 155 engage, as stated, to provide annular driving mechanism for rotating the saw table.

It will now appear that the cone pulley drive comprising cones 130 and 131, and connected gearing, controls the annular or rotative movement of the saw table 62. In view of the fact that the larger the circumference of the path comprising the cutting zones of the saws, the greater amount of metal to be cut, it will be clear that a small ingot having a small cutting zone area may be cut off at a more rapid angular movement than a large ingot having a larger cutting zone. The cone pulley drive automatically takes care of this factor. When the most advantageous cutting speed is determined for the particular metal being sawed the speed of the motor is set at this speed. The saws are brought toward each other to cut through the side wall of the ingot as has been described. After the saws have been automatically stopped in their inward movement by the operation of the feeler roller 127 and connected parts, the operator may start the rotative movement of the saw table. This is accomplished by lowering the hand lever 141 to raise tube 138 from neutral into slow speed driving position. As the table begins to rotate the feeler roller travels around the side wall of the metal being cut. In view of the fact that ingot molds are usually rectangular in cross section, it will appear that the feeler roller will be pushed backwardly as the saw approaches a corner of the ingot, thereby swinging the arched lever on its pivot and shortening the effective length of the control rope 121 by separating the pulleys 124 and 125. This movement if continued will bring the friction drive roller 112 into engagement with the friction plate 110 and thereby cause a reverse feed to take place due to the reverse rotation of the friction plate and right and left hand screws 94. This movement will back off the saws until they have passed around the corner of the ingot at which time the feeler roller will move inwardly again thereby returning the roller 114 into engagement with the plate 110 and the inward feed of the saws will be begun and will continue until the feeler roller reaches neutral position, at which time both friction rollers 112 and 114 will be brought out of contact with plate 110. In the meantime the belt shifter 134 has moved the belt 132 on the cones 130 and 131 to correspond to the movement of the saw blocks. This action of the belt shifter automatically speeds up or slows up the rotative movement of the saw table around the axis of the mold to correspond to the position of the saw blocks, that is, when the saw blocks are in an inward position near the axis of the mold table, the mold table will be rotated at a relatively higher rate of speed and when the saw blocks are moved outwardly to a distant position to the axis of the mold table the rotation of the mold table will be relatively slow.

In order to provide for a support for the cut off portion of the ingot molds, a scrap table 156 may be provided. This scrap table is illustrated in Figure 3, and is shown in Figure 4 in dotted lines. It preferably is provided with small caster rollers 157 which may rotate upon a suitable track 158 on the mold table. When the scrap is nearly severed the operator may place wedges between the scrap table and the mold table. This wedging operation, however, will fasten the scrap table to the end of the stationary ingot and consequently the saw table will rotate underneath the scrap table so that in positioning the scrap table 156 and wedging the scrap to the ingot the angular movement of the mold table should be considered, to allow sufficient track on which the scrap table may travel. By means of this arrangement it will be clear that the scrap may be so supported that when it is completely severed it will not pinch or break a cut-off saw.

The present disclosure comprises two saw members but obviously any plural number may be provided so long as the saws are symmetrically arranged around the axis of the saw table so that the sawing forces are in equilibrium. Preferably the saw blades are all rotated in the same absolute direction so that the forces so far as the saw table is concerned are balanced except the normal urging of the saw table in a rotative direction due to the operation of the sawing action. These forces are transmitted to the ingot and are effectually resisted by the large clamping jaws 42 and 44 which are securely mounted on the back wall 1 of the concrete foundation.

Having thus described my invention, what I claim is:

1. In a device of the class described a metal sawing machine comprising sawing means, in combination with a foundation, a head movably mounted on the foundation, and a plurality of adjustable hooks adapted to support the article to be sawed, said hooks being carried upon said head.

2. In a metal working machine the combination of a foundation, a rotating head pivoted on a vertical axis on said foundation, a plurality of adjustable hooks carried by said head, means to rotate said head to bring any one of said hooks into position to support the metal article being operated upon, and forming tools adapted to operate upon the metal article so positioned.

3. A metal working machine comprising in combination a foundation provided with a vertically extending wall, a rotating head on a vertical wall, a supporting bracket adapted to engage one side of said head to support the same, a plurality of hooks adjustably mounted in said head, means to rotate said head when desired to bring the desired hooks opposite to the supporting bracket whereby a load may be supported on one of said hooks, and means for locking said head against rotation.

4. In a metal working machine of the class described, the combination of a foundation comprising a vertical wall, means to suspend an article to be operated upon adjacent the face of said vertical wall, and a plurality of oppositely movable clamps adapted to hold said article and power driven means for automatically operating said clamps in unison.

5. In a metal working device of the character specified, a foundation comprising a vertical wall, a supporting member mounted upon said wall and being adapted to support a metal article to be operated upon, a plurality of clamp members having the jaws thereof extending horizontally, screw shafts adapted to operate said jaws, and power mechanism for rotating said shafts as desired.

6. A metal operating device of the character specified, comprising a vertical wall, a supporting member carried by said vertical wall, a bed plate on the face of said vertical wall, guide-ways in said bed plate, clamp members slidably mounted in said guide-ways, screw shafts extending through said clamp members and being adapted to slide the clamp members in said guide-ways, and power mechanism for operating said shafts.

7. A metal working machine of the class specified comprising a supporting member adapted to vertically suspend the article to be operated upon, clamps adapted to secure the article in position on said suspending member, a plurality of horizontally disposed saws arranged around the longitudinal axis of the article to be operated upon, whereby the saws may simultaneously attack said article in different places, means to operate said saws, and means to feed said saws whereby the paths of said saws are so aligned so that the kerfs of a preceding saw blends into the kerf of a succeeding saw when the cut is complete.

8. A metal working machine comprising in combination a support for vertically suspending and holding an article to be sawed, a plurality of saws horizontally disposed and arranged to attack said article simultaneously at different points, said saws being so arranged around said article that the sawing forces are balanced in a radial direction so that the operation of the saws does not tend to displace the longitudinal axis of the article operated upon.

9. In a metal working device of the character specified the combination of means for vertically suspending an article to be operated upon, a plurality of clamps for preventing rotation of said article, a plurality of saws horizontally disposed and adapted to simultaneously attack said article, means to rotate all of said saws in the same direction and said saws being arranged around said article in such manner that the radial forces of said saws are substantially balanced and the torsional forces of the sawing action is supported by said clamps.

10. A metal working device of the character specified comprising a support for an article to be operated upon, a turn table adapted to rotate in a horizontal plane below the end of said article, a plurality of operating tools mounted upon said turn table, means to bring said tools into engagement with the article to be operated upon, means to rotate said turn table to move said tools in a horizontal plane around said article, and means to maintain a uniform engagement between said tools and said article.

11. A metal working device of the character specified comprising means to vertically suspend an article to be operated upon, a horizontal turn table, a plurality of horizontally disposed saws mounted for radial movement on said turn table, means to feed said saws radially on said turn table, and means to rotate said saws during said radial feed.

12. A metal working device of the character specified comprising means to support an article to be operated upon, a turn table having the axis thereof substantially coincident with the axis of the article to be operated upon, a plurality of saws mounted upon said table for radial movement thereon, automatic driving means adapted to control said radial movement, and driving means for rotating said saws during said radial movement.

13. A metal working device of the character specified comprising means to vertically support an ingot mold or the like, a rotating table mounted beneath the position at which said ingot mold is to be supported, a plurality of circular saws mounted for radial movement upon said table, means to rotate said table, a device to drive said saws, and mechanism adapted to automatically control the relation of said saws to said mold when said table is rotated.

14. A metal working device of the character specified comprising means to support an article to be sawed, a turn table having the axis thereof substantially coincident with the axis of the article to be sawed, means to rotate said turn table, a plurality of circular saws mounted for radial movement upon said turn table, means for rotating said saws, mechanism for radially moving said saws on said turn table, and a feeler device adapted to contact with the article being sawed and to control the radial movement of said saws relative to said article.

15. A metal working device of the character specified comprising means to support an article to be operated upon, a turn table mounted beneath said means with the axis of the turn table substantially coincident with the axis on which the article is to be supported, a plurality of saws mounted on said turn table for radial movement thereon, mechanism comprising right and left hand screw shafts for controlling the radial movement of said saws on said turn table, driving mechanism for said screws whereby said screws may be driven in either direction to cause said saws to approach each other or to recede from each other, a feeler device adapted to contact with the surface of the article being sawed and to control the drive of said screws whereby said screws may operate to advance or retard the position of said saws when said saws are moved relatively to the article being sawed.

16. A metal working machine of the character specified comprising a support for an article being operated upon, a table, a plurality of circular saws movably mounted upon said table, means to cause said saws to approach or recede from each other, devices to cause a relative movement between said article and said table, and mechanism adapted to control said relative movement in relation to the radial position of said saws upon said table.

17. In a metal working device of the character described in combination of means to support an article to be sawed, a table upon which a plurality of saws are movably mounted, means to rotate said saws, means to move said saws toward or from the article to be sawed, means to cause a relative movement between said article and said table device to automatically maintain said saw in a definite relation to the article being sawed, and automatic means for controlling the relative rotative movement according to the position of said saws in their relation to the axis of the article being sawed.

18. A metal working device of the character specified comprising means to support an article to be sawed, a rotating table, a plurality of saws mounted on said rotating table for radial movement thereof, slow speed mechanism for moving said saws in said radial direction, and hand controlled high speed drive mechanism for operating said saws in a radial direction at a relatively high rate of speed.

19. In a metal working device of the character specified the combination of means to support an article to be sawed; a table upon which a plurality of saws are mounted for radial movement; means to cause said table to rotate around said article to be sawed, said means comprising automatic slow speed drive mechanism, and hand control high speed mechanism, both of said drive mechanism comprising gearing and variable speed controlled devices.

20. In a device of the class described a metal sawing machine comprising sawing means, in combination with a foundation, said foundation comprising a vertical wall, work supporting members mounted on said wall, a head movably mounted on the foundation and a plurality of adjustable hooks adapted to support the article to be sawed, said hooks being carried upon said head.

21. In a device of the class described a metal sawing machine comprising sawing means, in combination with a foundation, a head movably mounted on the foundation, and a plurality of adjustable hooks provided with designation characters and adapted to support the article to be sawed, said hooks being carried upon said head.

22. In a device of the class described a metal sawing machine comprising sawing means, in combination with a foundation, a head movably mounted on the foundation, and provided with vertical slots, a plurality of adjustable hooks adapted to support the article to be sawed, said hooks being carried upon said head and slidably mounted in said slots.

23. In a device of the class described a metal sawing machine comprising sawing means, in combination with a foundation, said foundation comprising a vertical wall having a work support attached to its vertical face, a head movably mounted on the foundation, and a plurality of adjustable hooks provided with designation characters and adapted to support the article to be sawed, said blocks being carried upon said head and slidably mounted in said slots.

24. In a metal working machine the combination of a foundation, a rotating head pivoted on a vertical axis on said foundation, a plurality of adjustable hooks carried by said head, friction drive means to rotate said head to bring any one of said hooks into position to support the metal article being operated upon, devices to lock the head against rotation when desired, and forming tools being adapted to operate upon the metal article so positioned.

25. A metal working machine comprising in combination a foundation provided with a vertically extending wall, said rotating head on a vertical wall in such manner that a portion of the head over-hangs said wall, a supporting bracket adapted to engage one side of said head opposite to the over-hanging portion to support the said head, a plurality of hooks adjustably mounted in said head, means to rotate said head when desired to bring the desired hooks opposite to the supporting bracket whereby a load may be supported on one of said hooks, and means for locking said head against rotation.

26. In a metal working machine of the class described, the combination of a foundation comprising a vertical wall, means comprising a rotatable head to support an article to be operated upon adjacent the face of said vertical wall, and a plurality of clamps adapted to hold said article and power driven means for automatically operating said clamps to center an article held thereby in such manner that the center line of said article is directly under the rotatable head.

27. In a metal working device of the character specified, a foundation comprising a vertical wall, a supporting member mounted upon said wall and being adapted to support a metal article to be operated upon, a plurality of pairs of clamp members having the jaws thereof extending horizontally, a screw shaft for each pair of jaws, and friction drive mechanism for rotating said shafts in either direction thereby to open or close said jaws as desired.

28. A metal working device of the character specified, comprising a vertical support, a load carrying member carried by said vertical support, a bed plate on the face of said vertical support, guideways in said bed plate, clamp members slidably mounted in said guideways, means to slide the clamp members in said guideways and power mechanism for operating said means.

29. A metal working device of the character specified, comprising a vertical wall, a supporting member carried by said vertical wall, a bed plate on the face of said vertical wall, guideways in said bed plate, clamp members slidably mounted in said guideways, means to slide the clamp members in said guideways, and mechanism for operating said means.

30. A metal working machine of the class specified comprising a supporting device adapted to support the article to be operated upon, clamps adapted to secure the article in position on said supporting device, a plurality of cutting members arranged to rotate around the longitudinal axis of the article to be operated upon, whereby the cutting members may simultaneously attack said article in different places, means to drive said cutting members, and means to feed said cutting members whereby the paths of said members are so aligned that the path of a preceding member blends into the path of a succeeding member when the cut is complete.

31. A metal working machine comprising in combination a support for vertically suspending and holding an article to be sawed, a turn table having an axis of rotation directly beneath said article, a plurality of saws horizontally disposed on said turn table and arranged to attack said article simultaneously at different points means for driving said saws independently of the movement of said turn table, said saws being so arranged around said article that the sawing forces are balanced in a radial direction so that the operation of the saws does not tend to displace the longitudinal axis of the article operated upon.

32. A metal working machine comprising in combination a support for vertically supporting and holding an article to be sawed, a horizontal turn table having an axis of rotation directly beneath said article, a plurality of saws horizontally disposed on said turn table and arranged to attack said article simultaneously at different points, means to move said saw radially on said table, said saws being so arranged around said article that the sawing forces are balanced in a radial direction so that the operation of the saws does not tend to laterally displace the longitudinal axis of the article operated upon.

33. In a metal working device of the character specified the combination of adjustable means for vertically supporting an article to be operated upon, clamps for preventing rotation of said article, a plurality of saws mounted for planetary movement around the axis of the article and adapted to simultaneously attack said article, means to rotate all of said saws in the same direction independently of their planetary movement and said saws being arranged around said article in such manner that the radial forces of said saws are substantially balanced and the torsional forces of the sawing action is supported by said clamps.

34. A metal working device of the character specified comprising a support for an article to be operated upon, a turn table, a cutting tool mounted upon said turn table, means to bring said tool into engagement with the article to be operated upon, means to rotate said turn table to move said tool around said article, and means controlled by the shape of the article adjacent the path of the tool to maintain a uniform engagement between said tool and said article.

35. A metal working device of the character specified comprising means to support an article to be operated upon, a turn table, a plurality of saws mounted for radial movement on said turn table, means to feed said saws radially on said turn table, means to rotate said saws during said radial feed, and saw controlling means to regulate the speed of the saw automatically in relation to the distance of the saw axis from the axis of the turn table.

36. A metal working device of the character specified comprising adjustable means to support an article to be operated upon, a turn table having the axis thereof substantially coincident with the axis of the article to be operated upon, a plurality of circular saws mounted upon said table for radial movement thereon, automatic driving means adapted to control the speed of rotation of the turn table, driving means for rotating said saws during said radial movement.

37. A metal working device of the character specified comprising means to support an article to be operated upon, a turn table having the axis thereof substantially coincident with the axis of the article to be operated upon, a saw mounted upon said table for radial movement thereon, automatic driving means adapted for the radial movement, means for rotating said saw during said radial movement, and means to automatically control the radial position of the saw on the turn table due to the shape of the article.

38. A metal working device of the character specified comprising adjustable means to support an article to be operated upon, a turn table having the axis thereof substantially coincident with the axis of the article to be operated upon, a plurality of circular saws mounted upon said table for radial movement thereon, automatic driving means adapted to control the speed of rotation of the turn table, driving means for rotating said saws during said radial movement, and devices to automatically control the radial position of the same on the turn table.

39. A metal working device of the character specified comprising means to vertically support an ingot mold or the like, a rotating table mounted beneath the position at which said ingot mold is to be supported, a plurality of small circular saws mounted for radial movement upon said table, means to rotate said table, a device to drive said saws, and mechanism controlled by the cross-sectional shape of the mold to automatically control the relation of said saws to said mold when said table is rotated.

40. A metal working device of the character specified comprising means to vertically support an ingot mold or the like, a rotating table mounted beneath the position at which said ingot mold is to be supported, a plurality of circular saws mounted for radial movement upon said table, means to rotate said table at slow operating speed, means to rotate said table at high speed, a device to drive said saws, and mechanism adapted to automatically control the relation of said saws to said mold when said table is rotated.

41. A metal working device of the character specified comprising means to support an article to be sawed, a turn table having the axis thereof substantially coincident with the axis of the article to be sawed, means to rotate said turn table, a circular saw mounted for radial movement upon said turn table, a screw shaft to adjust said saw radially on the table, means for rotating said saw during said radial adjustment, and a feeler device adapted to contact with the article being sawed and to control the radial movement of said saw relative to said article.

42. A metal working device of the character specified comprising means to support an article to be sawed, a turn table having the axis thereof substantially coincident with the axis of the article to be sawed, means to rotate said turn table at variable speeds, a plurality of circular saws mounted for radial movement upon said turn table, means for rotating said saws, and a feeler device mounted adjacent the axis of one of said saws and adapted to contact with the article being sawed and to control the radial movement of said saws relative to said article.

43. A metal working device of the character specified comprising means to support an article to be operated upon, a turn table mounted beneath said means with the axis of the turn table substantially coincident with the axis on which the article is to be supported, a plurality of saws mounted on said turn table for radial movement thereon, mechanism comprising a screw controlling the radial movement of said saws on said turn table, driving mechanism comprising a friction disc and a pair of friction rolls on a movable quill for driving said screw whereby said screw may be driven in either direction to cause said saws to approach each other or to recede from each other, a feeler device adapted to contact with the surface of the article being sawed and to control the quill of the driving mechanism for said screw whereby said screw may operate to advance or retract the position of said saws when said saws are moved relatively to the article being sawed.

44. A metal working device of the character specified comprising means to support an article to be operated upon, a turn table mounted beneath said means with the axis of the turn table substantially coincident with the axis on which the article is to be supported, a plurality of saws mounted on said turn table for radial movement thereon, mechanism comprising a screw for controlling the radial movement of said saws on said turn table, driving mechanism for said screw whereby said screw may be driven in either direction to cause said saws to approach each other or to recede from each other, a feeler device adapted to contact with the surface of the article being sawed and to control the drive of said screw whereby said screw may operate to advance or retract the position of said saws when said saws are moved relatively to the article being sawed, and means to retard the speed of rotation of the saws as the saws recede from the axis of the turn table.

45. A metal working device of the character specified comprising means to support an article to be operated upon, a turn table mounted beneath said means with the axis of the turn table substantially coincident with the axis on which the article is to be supported, a plurality of saws mounted on said turn table for radial movement thereon, mechanism comprising a screw for controlling the radial movement of said saws on said turn table, driving mechanism comprising a friction disc and a pair of friction rolls on a movable quill for driving said screw whereby said screw may be driven in either direction to cause said saws to approach each other or to recede from each other, a feeler device adapted to contact with the surface of the article being sawed and to control the quill of the driving mechanism for said screw whereby said screw may operate to advance or retract the position of said saws when said saws are moved relatively to the article being sawed, and means to retard the speed of rotation of the saws as the saws recede from the axis of the turn table.

46. An ingot mold saw comprising a support to suspend the molds vertically, a rotary table beneath said support, a plurality of horizontally disposed circular saws movably mounted upon said table, means to cause said saws to approach or recede from each other, devices to cause a relative movement between said mold and said table, and mechanism adapted to control said relative movement in relation to the radial position of the said saws upon said table.

47. An ingot mold saw comprising in combination means to suspend an ingot mold to be sawed, a support on which a plurality of saws are movably mounted, independent drive means to rotate said saws, means to move said saws toward or from the mold to be sawed, means to cause a relative movement between said mold and said support to automatically maintain said saws in a definite relation to the mold being sawed, and automatic means for controlling the relative rotative movement according to the position of said saws in their relation to the axis of the mold being sawed.

48. An ingot mold saw comprising means to support an ingot mold to be sawed, a rotating table, means to rotate said table at slow speed, a plurality of saws mounted on said rotating table for radial movement thereof, slow speed mechanism for moving said saws in said radial direction, and hand controlled high speed drive mechanism for operating said saws in a radial direction at a relatively high rate of speed.

49. An ingot mold saw comprising means to support an ingot mold to be sawed, a rotating table, means to rotate said table at slow speed, hand controlled means to rotate said table at high speed, a plurality of saws mounted on said rotating table for radial movement thereof, slow speed mechanism for moving said saws in said radial direction, and hand controlled high speed drive mechanism for operating said saws in a radial direction at a relatively high rate of speed.

50. In a metal working device of the character specified the combination of means to suspend an ingot mold to be sawed; a table upon which a plurality of saws are mounted for radial movement thereon; variable speed driving means to rotate said saws; means to cause said table to rotate around said mold to be sawed, said means comprising automatic slow speed drive mechanism to rotate said table and hand controlled high speed mechanism to rotate said table.

51. In a metal working device of the character specified the combination of means to suspend an ingot mold to be sawed; a table upon which a plurality of saws are mounted for radial movement thereon; variable speed driving means to rotate said saws; means to cause said table to rotate around said mold to be sawed, said means comprising automatic slow speed drive mechanism to rotate said table, and hand controlled high speed mechanism to rotate said table, and automatic means to operate said control devices according to the shape of the mold.

52. In a device of the class described, means for sawing a metallic article in combination with a foundation, a head movably mounted on the foundation, and a plurality of article supporting members carried on said head.

53. In a device of the class described, means for sawing a metallic article in combination with a foundation, a head movably mounted on the foundation, a plurality of article supporting members carried on said head, and means for positioning said members at any predetermined height relative to one another.

54. In a metal working device of the character specified, a foundation comprising a vertical wall, a member mounted upon said wall to suspend a metallic article to be operated upon, a plurality of clamp members having the jaws thereof extending horizontally, screw shafts adapted to operate said jaws, and power mechanism for rotating said shafts as desired.

55. A metal working device of the character specified, comprising a vertical wall, a supporting member carried by said vertical wall, a bed plate on the face of said vertical wall, clamp members slidably mounted on said bed plate, screw shafts extending through said clamp members adapted to slide the clamp members on said bed plate, and power mechanism for operating said shafts.

56. A metal working device of the character specified comprising a vertical support, a load carrying member carried by said vertical support, a bed plate on the face of said vertical support, clamp members slidably mounted on said bed plate, means to slide the clamp members with respect to said bed plate, and mechanism for operating said means.

57. A metal working device of the character specified comprising means to vertically support an ingot mold or the like, a rotating table mounted beneath the position at which said mold is to be supported, a circular saw mounted for radial movement upon said table, means to rotate said table, a device to drive said saw, and mechanism adapted to automatically control the relation of said saw to said mold when said table is rotated.

58. A metal working device of the character specified comprising means to support an article to be sawed, a turn table having the axis thereof substantially coincident with the axis of the article to be sawed, means to rotate said turn table, a circular saw mounted for radial movement upon said turn table, means for rotating said saw, mechanism for radial movement of said saw on said turn table, and a feeder device adapted to contact with the article being sawed to control the radial movement of said saw relative to said article, thereby controlling the rate of feed for said saw.

59. A metal working machine of the character specified, comprising a support for an article being operated upon, a table, a circular saw mounted upon said table, means to cause said saw to approach an article to be sawed, devices to cause a relative movement between said article and said table, and mechanism adapted to control said relative movement in relation to the radial movement of said saw upon said table.

60. A metal working device of the character specified, comprising means to support an article to be sawed, a saw mounted on said rotating table for radial movement thereof, slow speed mechanism for moving said saw in a radial direction, at a relatively low speed and high speed drive mechanism for operating said saw in a radial direction at a relatively high rate of speed.

61. In a device of the class described, a metal sawing machine comprising sawing means in combination with a foundation, said foundation comprising a vertical wall, work holding members mounted on said wall, a head and movable supporting means adapted to support the article to be sawed, said means being carried upon said head.

62. A metal working device of the character specified, comprising adjustable means to support an article to be operated upon, a turn table having the axis thereof substantially coincident with the axis of the article to be operated upon, a saw mounted upon said table for radial movement thereof, automatic driving means adapted to control the speed of rotation of the turn table, and driving means for rotating said saw during said rotary movement.

63. A metal working device of the class described, comprising means to vertically support an ingot mold or the like, a rotating table beneath the position at which said mold is to be supported, a circular saw mounted for radial movement upon said table, means to rotate said table, a device to drive said saw, a mechanism controlled by the cross-sectional shape of the mold to automatically control the relation of said saw to said mold when said table is rotated.

64. An ingot mold saw comprising means to support an ingot mold to be sawed, a rotating table, means to rotate said table at slow speed, a saw mounted on said rotating table for radial movement thereof, slow speed mechanism for moving said saws in said radial direction, and high speed mechanism for moving said saw in a radial direction at a relatively high rate of speed.

RAY G. COATES.